US008472787B2

(12) United States Patent
Tzeng

(10) Patent No.: US 8,472,787 B2
(45) Date of Patent: Jun. 25, 2013

(54) METHOD AND APPARATUS FOR DETECTING A NOISE VALUE OF A VIDEO SIGNAL

(75) Inventor: Ming-Yang Tzeng, Taichung Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 803 days.

(21) Appl. No.: 12/274,966

(22) Filed: Nov. 20, 2008

(65) Prior Publication Data
US 2009/0135255 A1 May 28, 2009

(30) Foreign Application Priority Data

Nov. 21, 2007 (TW) .............................. 96144068 A

(51) Int. Cl.
H04N 5/92 (2006.01)
(52) U.S. Cl.
USPC .......................................... 386/264; 386/263
(58) Field of Classification Search
None
See application file for complete search history.

(56) References Cited

U.S. PATENT DOCUMENTS

| 6,784,944 | B2 | 8/2004 | Zhang et al. |
| 7,139,035 | B2 | 11/2006 | Kempf |
| 2005/0271298 | A1 | 12/2005 | Yu |
| 2005/0286629 | A1* | 12/2005 | Dumitras et al. ........ 375/240.03 |
| 2006/0158562 | A1* | 7/2006 | Rhee ............................. 348/607 |
| 2008/0080618 | A1* | 4/2008 | Takagi et al. ............ 375/240.16 |
| 2008/0205854 | A1* | 8/2008 | Xu et al. ....................... 386/114 |

FOREIGN PATENT DOCUMENTS

KR  20050022160  3/2005

OTHER PUBLICATIONS

Abstract of KR2005022160.

* cited by examiner

Primary Examiner — William C Vaughn, Jr.
Assistant Examiner — Eileen Adams
(74) Attorney, Agent, or Firm — McClure, Qualey & Rodack, LLP

(57) ABSTRACT

A method for detecting a noise value of a video signal comprises the steps of determining a spatial domain difference according to a plurality of pixels of a first frame of the video signal, determining a temporal domain difference according to the pixels of the first frame of the video signal and a plurality of pixels of a second frame of the video signal, and generating a noise value of the first frame of the video signal according to the spatial domain difference and the temporal domain difference. An apparatus for detecting a noise value of a video signal performs the aforementioned method.

19 Claims, 5 Drawing Sheets

METHOD AND APPARATUS FOR DETECTING A NOISE VALUE OF A VIDEO SIGNAL

CROSS-REFERENCE TO RELATED APPLICATION

This application claims priority of Taiwanese application no. 096144068, filed on Nov. 21, 2007.

BACKGROUND OF THE INVENTION

1. Field of the Invention

The invention relates to a method and apparatus for detecting a noise value of a video signal, more particularly to a method and apparatus for identifying frames with noise of a video signal.

2. Description of the Related Art

In U.S. Pat. Nos. 6,784,944 and 7,139,035, there are disclosed conventional noise detection methods that identify noisy frames of a video signal using information in a spatial domain.

The aforementioned conventional noise detection methods are disadvantageous in that, since the information of the spatial domain are based on the amount of high frequency components of a frame of a video signal, the conventional noise detection methods erroneously identify a frame with a high amount of high frequency components as a noisy frame. As such, the conventional noise detection methods are applicable only for video signals that include frames with a high amount of low frequency components and a low amount of high frequency components.

SUMMARY OF THE INVENTION

Therefore, the object of the present invention is to provide a method and apparatus that can overcome the aforesaid drawback of the prior art.

According to an aspect of the present invention, a method for detecting a noise value of a video signal comprises the steps of: determining a spatial domain difference according to a plurality of pixels of a first frame of the video signal, determining a temporal domain difference according to the pixels of the first frame of the video signal and a plurality of pixels of a second frame of the video signal, and generating a noise value of the first frame according to the spatial domain difference and the temporal domain difference. The second frame is temporally adjacent to the first frame.

According to another aspect of the present invention, an apparatus for detecting a noise value of a video signal comprises a first circuit, a second circuit, and a third circuit. The first circuit determines a spatial domain difference according to a plurality of first pixels of a first frame of the video signal. The second circuit determines a temporal domain difference according to the first pixels, and a plurality of second pixels of a second frame, which is temporally adjacent to the first frame. The third circuit generates the noise value according to the spatial domain difference and the temporal domain difference.

BRIEF DESCRIPTION OF THE DRAWINGS

Other features and advantages of the present invention will become apparent in the following detailed description of the preferred embodiment according to the accompanying drawings, of which.

DETAILED DESCRIPTION OF THE PREFERRED EMBODIMENT

Figure 1:
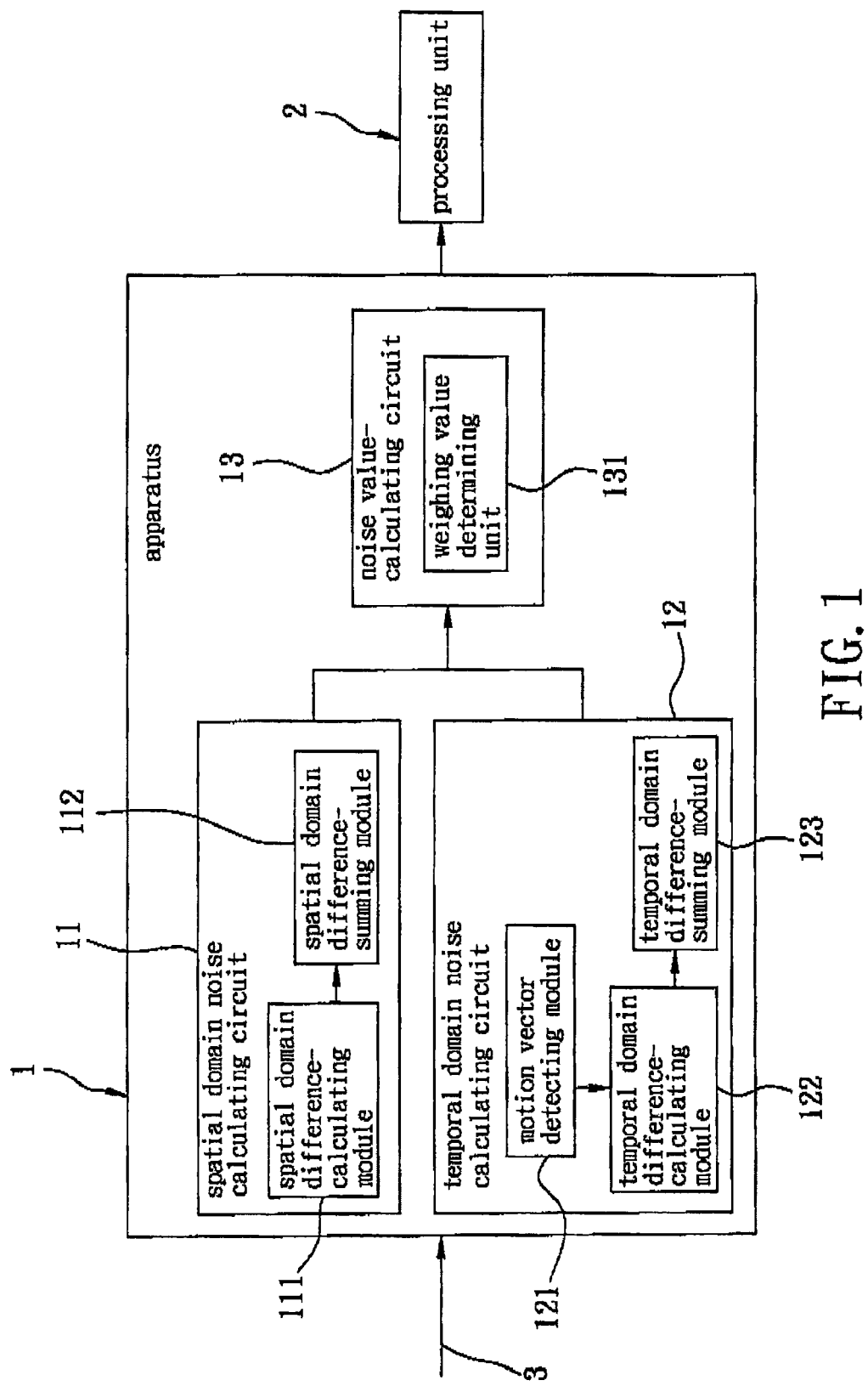
FIG. 1 is a block diagram of the preferred embodiment of an apparatus for detecting a noise value of a video signal according to the present invention.
Figure 2:
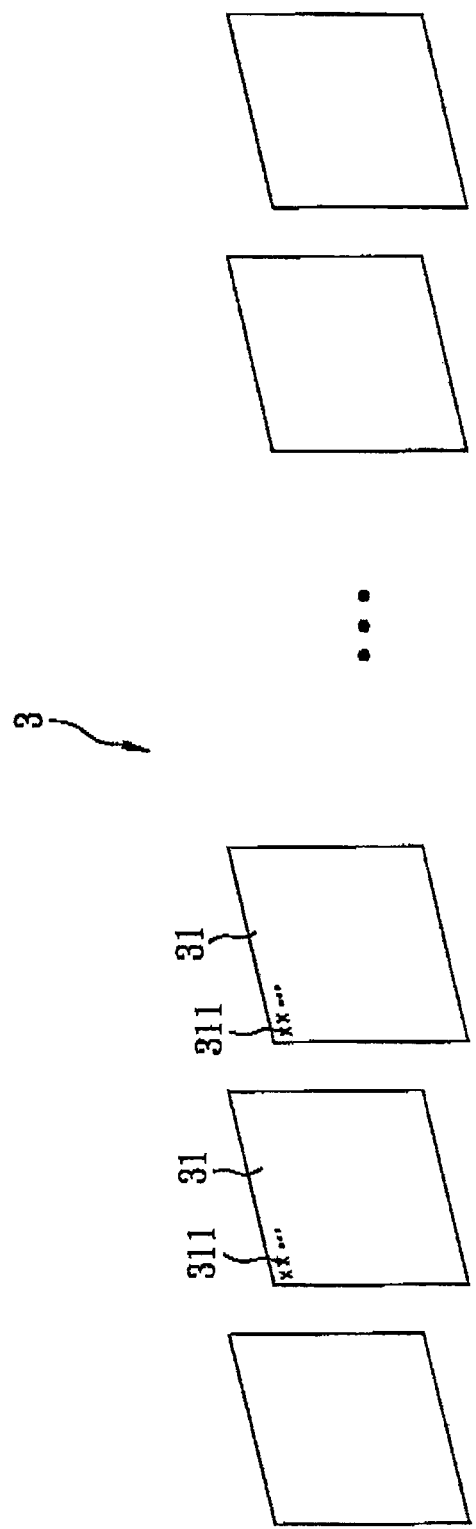
FIG. 2 is a schematic view illustrating a plurality of frames of a video signal.

Referring to FIGS. 1 and 2, the preferred embodiment of an apparatus 1 for detecting a noise value of a video signal 3 according to this invention is shown to include a spatial domain noise calculating circuit 11, a temporal domain noise calculating circuit 12, and a noise value-calculating circuit 13.

The apparatus 1 of this embodiment receives the video signal 3 that comprises a plurality of frames 31, as illustrated in FIG. 2, to detect noise in each of the frames 31 of the video signal 3 and identify frames with noise of the video signal 3, in a manner that will be described hereinafter.

Each of the frames 31 of the video signal 3 comprises a plurality of pixels 311, each of which has a pixel value.

The spatial domain noise calculating circuit 11 comprises a spatial domain difference-calculating module 111 and a spatial domain difference-summing module 112.

The temporal domain noise calculating circuit 12 comprises a motion vector detecting module 121, a temporal domain difference-calculating module 122, and a temporal domain difference-summing module 123.

The noise value-calculating circuit 13 is coupled to the spatial domain noise calculating circuit 11 and the temporal domain noise calculating circuit 12, and comprises a weighing value determining unit 131 that determines a weighing value for each of a spatial weighing and a temporal weighing according to a spatial domain difference and a temporal domain difference.

Figure 3:
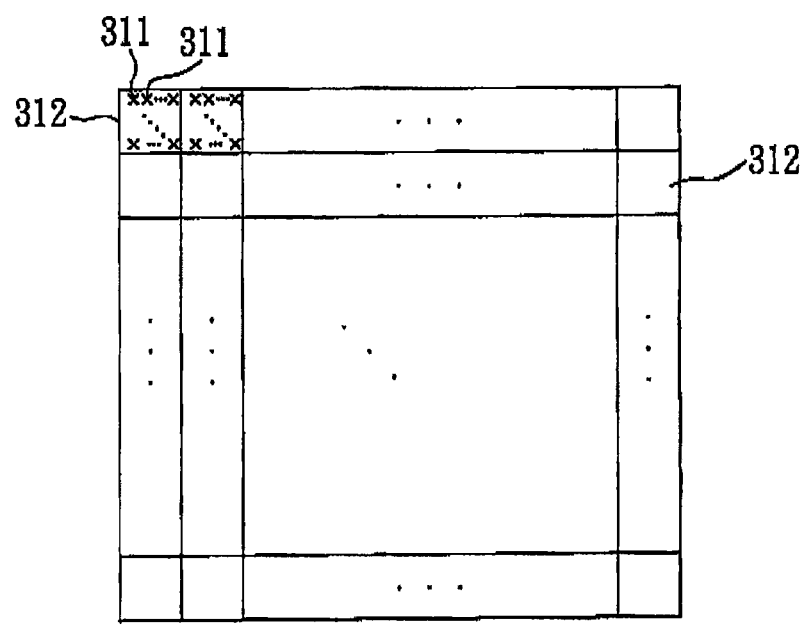
FIG. 3 is a schematic view illustrating pixels of one of the frames of the video signal divided into a plurality of blocks.

The spatial domain noise calculating circuit 11 is provided to perform calculations based on the pixels 311 of a current frame, i.e., one of the frames 31, of the video signal 3 to determine the spatial domain difference. The difference-calculating module 111, as illustrated in FIG. 3, divides the current frame 31 of the video signal 3 into a plurality of blocks 312, each of which comprises a portion of the pixels 311 of the current frame 31 of the video signal 3, and obtain a value for each of the blocks 312 by calculating a pixel difference between adjacent pairs of the pixels 311. The difference-summing module 112 is coupled to the difference-calculating module 111, and sums up the values obtained by the difference-calculating module 111 to obtain the spatial domain difference.

It is noted that the value obtained by the difference-calculating module 111 for each of the blocks 312 is a sum of pixel differences between adjacent pairs of the pixels 311 of the block 312 of the current frame 31 of the video signal 3.

Figure 4:
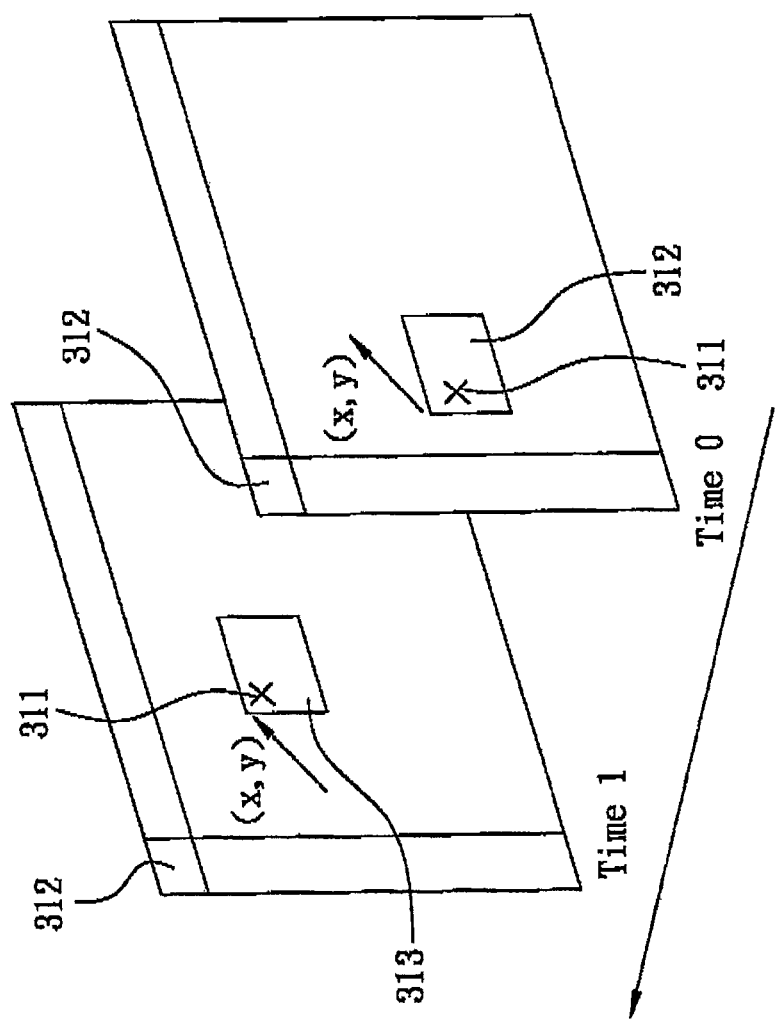
FIG. 4 is a schematic view illustrating a temporally adjacent pair of the frames of the video signal.

With further reference to FIG. 4, the temporal domain noise calculating circuit 12 is provided to perform calculations based on the pixels 311 of the current frame 31 of the video signal 3 and the pixels 311 of an adjacent frame, i.e., another one of the frames 31 that is temporally adjacent to the current frame 31, of the video signal 3, to obtain the temporal domain difference. The motion vector detecting module 121 divides the current frame 31 of the video signal 3 into a plurality of first blocks 312 each of which comprises a portion of the pixels 311 of the current frame 31 of the video signal 3, and the adjacent frame 31 of the video signal 3 into a plurality of second blocks 313, each of which comprises a portion of the pixels 311 of the adjacent frame 31 of the video signal 3. Thereafter, the motion vector detecting module 121 finds a most similar one of the second blocks 313 for each of the first blocks 312. The difference-calculating module 122 is coupled to the motion vector detecting module 121, and obtain a temporal domain block difference by calculating block differences for each of the first blocks 312 and the most similar one of the second blocks 313 thus found. The difference-summing module 123 is coupled to the difference-calculating module 122, and sums up the values obtained by the difference-calculating module 122 to obtain the temporal domain difference.

It is noted that the value obtained by the difference-calculating module 122 for each of the first blocks 312 is a sum of pixel differences between the pixels 311 of the first block 312 and the pixels 311 of the most similar one of the second blocks 313 thus found.

In this embodiment, the noise value-calculating circuit 13 is provided to generate a noise value of the current frame 31 of the video signal 3 according to the spatial domain difference, the temporal domain difference, the spatial weighing value and the temporal weighing value.

The apparatus 1 identities the current frame 31 as a frame with noise when the noise value generated by the noise value-calculating circuit 13 exceeds a threshold value.

In addition, a processing unit 2 may be coupled to the apparatus 1 for processing frames with noise of the video signal 3 to thereby improve an image quality of the frame with noise. For example, the processing unit 2 may reduce noise in the frame with noise of the video signal 3 by one of a noise filtering scheme and a bit allocation scheme, in a manner well known in the art.

Figure 5:
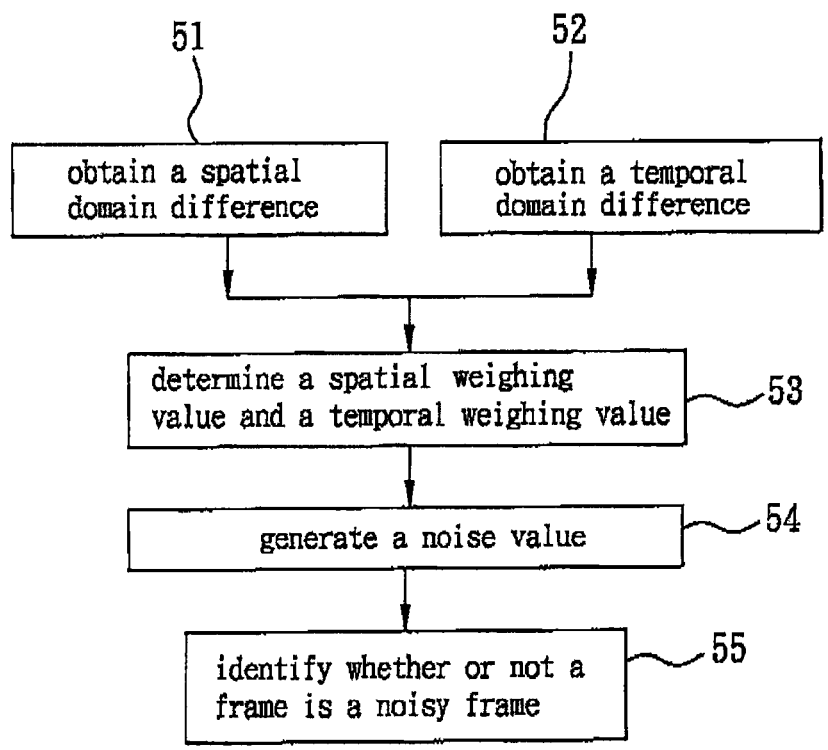
FIG. 5 is a flow chart of a preferred embodiment of a method for detecting a noise value of a video signal to be implemented using the apparatus shown in FIG. 1 according to the present invention.

The preferred embodiment of a method for detecting a noise value of the video signal 3 to be implemented using the aforementioned apparatus 1 according to this invention will now be described with further reference to FIG. 5.

In step 51, the spatial domain noise calculating circuit 11 performs calculations based on the pixels 311 of the current frame 31 of the video signal 3 to obtain the spatial domain difference.

In this embodiment, step 51 comprises the following sub-steps:

(sub-step 511) dividing the pixels 311 of the current frame 31 of the video signal 3 into the blocks 312 by the difference-calculating module 111;

(sub-step 512) generating the spatial domain block differences by the difference-calculating module 111 to calculate a pixel difference for each of the blocks 312; and (sub-step 513) summing up the spatial domain block differences obtained by the difference-calculating module 111 to obtain the spatial domain difference by the difference-summing module 112.

In step 52, the temporal domain noise calculating circuit 12 performs calculations based on the pixels 311 of the current frame 31 of the video signal 3 and the pixels 311 of the adjacent frame 31 of the video signal 3 to obtain the temporal domain difference.

In this embodiment, step 52 comprises the following sub-steps:

(sub-step 521) dividing the pixels 311 of the current frame 31 of the video signal 3 into the first blocks 312 by the motion vector detecting module 121;

(sub-step 522) dividing the pixels 311 of the adjacent frame 31 of the video signal 3 into the second blocks 313 by the motion vector detecting module 121;

(sub-step 523) finding a most similar one of the second blocks 313 for each of the first blocks 312 by the motion vector detecting module 121.

It is noted that, in this sub-step, the motion vector detecting module 121 performs a motion vector search for a motion vector (x, y) for each of the first blocks 312. The motion vector (x, y) represents the most similar one of the second blocks 313. Moreover, in this sub-step, the difference-calculating module 122 calculates a temporal domain block difference for each of the first blocks 312 and for the most similar one of the second blocks 313 thus found; and (sub-step 524) summing up the temporal domain block differences obtained by the difference-calculating module 122 to obtain the temporal domain difference by the difference-summing module 123.

In step 53, the weighing value determining unit 131 determines the spatial weighing value and the temporal weighing value according to the spatial domain difference and the temporal domain difference.

It is noted that, in this step, the value, e.g., 1, is assigned to the spatial weighing value is larger than the value, e.g., 0, assigned to the temporal weighing value when the temporal domain difference exceeds a threshold value, indicative of the condition where the motion vector detecting module 121 was unable to find the most similar one of the second block 313, e.g., during a scene change. On the other hand, the value, e.g., 1, assigned to the temporal weighing value is larger than the value, e.g., 0, assigned to the spatial weighing value when the spatial domain difference exceeds the threshold value. Further, the values, e.g., 0.5, assigned to the spatial weighing value and the temporal weighing value can be set to be equal when neither the spatial domain difference nor the temporal domain difference exceeds the threshold value, e.g., when there in no scene change. Herein, the sum of the spatial weighing value and the temporal weighing value is 1.

In step 54, the noise value-calculating circuit 13 generates the noise value of the current frame 31 of the video signal 3 by summing up the product of the spatial domain difference and the spatial weighing value and the product of the temporal domain difference and the temporal weighing value.

In step 55, the apparatus 1 identifies the current frame 31 of the video signal 3 as a frame with noise when the noise value generated in step 54 exceeds a threshold value.

It is noted that, in this embodiment, steps 51 and 52 are performed simultaneously.

It has thus been shown that the method of this invention uses information in the spatial and temporal domains to detect noise in the frames 31 of the video signal 3. As such, the method and apparatus of this invention can accurately identify frames with noise of a video signal.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for detecting a noise value of a video signal, comprising:

determining a spatial domain difference of the video signal according to a plurality of pixels of a first frame of the video signal;

determining a plurality of pixels of a second frame of the video signal according to a calculated degree of similarity relative to the pixels of the first frame;

determining a temporal domain difference of the video signal according to the pixels of the first frame of the video signal and the plurality of pixels of the second frame of the video signal, wherein the temporal domain difference is determined according to a sum of pixel differences corresponding to pixels of a first block in the first frame and pixels of a most similar block among a plurality of second blocks in the second frame; wherein the plurality of pixels of the second frame are determined according to a motion vector relative to the pixels of the first frame; and wherein the second frame is temporally adjacent to the first frame; and generating a noise value of the first frame according to a weighted combination of the spatial domain difference and the temporal domain difference, wherein the second frame is temporally adjacent to the first frame.

2. The method of claim 1, further comprising:

determining a spatial weighing value and a temporal weighing value according to the spatial domain difference and the temporal domain difference, wherein, the noise value is generated according to the spatial domain difference, the temporal domain difference, the spatial weighing value, and the temporal weighing value.

3. The method of claim 2, wherein the spatial weighing value is larger than the temporal weighing value when the temporal domain difference exceeds a threshold value.

4. The method of claim 2, wherein the spatial weighing value is 1 and the temporal weighing value is 0 when the temporal domain difference exceeds a threshold value.

5. The method of claim 2, wherein the noise value is generated by summing up the product of the spatial domain difference and the spatial weighing value and the product of the temporal domain difference and the temporal weighing value.

6. The method of claim 1, wherein the step of determining the spatial domain difference further comprises:

dividing the pixels of the first frame into a plurality of first blocks;

determining a plurality of spatial domain block differences for each of the first blocks; and summing up the spatial domain block differences to obtain the spatial domain difference.

7. The method of claim 1, wherein the step of determining the temporal domain difference further comprises:

dividing the pixels of the first frame into a plurality of first blocks;

dividing the pixels of the second frame into a plurality of second blocks;

finding one of the second blocks for each of the first blocks to obtain a temporal domain block difference for each of the first blocks according to the first blocks and the second blocks; and summing up the temporal domain block differences to generate the temporal domain difference.

8. The method of claim 7, wherein the step of obtaining the temporal domain difference further comprises:

determining a difference between each pixels of the first blocks and the second blocks; and summing up the differences to obtain the temporal domain block difference.

9. An apparatus for detecting a noise value of a video signal, comprising:

a first circuit for determining a spatial domain difference of the video signal according to a plurality of first pixels of a first frame of the video signal;

a second circuit for determining a temporal domain difference of the video signal according to the first pixels, and a plurality of second pixels of a second frame, which is temporally adjacent to the first frame, wherein the temporal domain difference is determined according to a sum of pixel differences corresponding to pixels of a first block in the first frame and pixels of a most similar block among a plurality of second blocks in the second frame, and wherein the plurality of second pixels of the second frame are selected according to a motion vector relative to the first pixels of the first frame; and a third circuit for generating a noise value according to a weighted combination of the spatial domain difference and the temporal domain difference.

10. The apparatus of claim 9, wherein the third circuit comprises a weighing value determining unit for determining a spatial weighing value and a temporal weighing value according to the spatial domain difference and the temporal domain difference, wherein the third circuit determines the noise value according to the spatial domain difference, the temporal domain difference, the spatial weighing value and the temporal weighing value.

11. The apparatus of claim 10, wherein the spatial weighing value is larger than the temporal weighing value when the temporal domain difference exceeds a threshold value.

12. The apparatus of claim 10, wherein the spatial weighing value is 1 and the temporal weighing value is 0 when the temporal domain difference exceeds a threshold value.

13. The apparatus of claim 10, wherein the third circuit generates the noise value by summing up the product of the spatial domain difference and the spatial weighing value and the product of the temporal domain difference and the temporal weighing value.

14. The apparatus of claim 9, wherein the first circuit comprises:

a first difference-calculating module for dividing the plurality of first pixels of the first frame into a plurality of blocks, and generating a spatial domain block difference for each block of the first frame; and a first difference-summing module, coupled to the first difference-calculating module, for summing up the spatial domain block differences to generate the spatial domain difference.

15. The apparatus of claim 14, wherein the spatial domain block difference for each of the blocks is a sum of pixel differences between adjacent pairs of the pixels of the block of the first frame.

16. The apparatus of claim 9, wherein the second circuit comprises:

a motion vector detecting module for dividing the first pixels of the first frame and the second pixels of the second frame into a plurality of first blocks and second blocks, respectively, and finding one of the second blocks for each of the first blocks;

a second difference-calculating module, coupled to the motion vector detecting module, for generating a temporal domain block difference according to the first blocks and the second blocks; and a second difference-summing module, coupled to the second difference-calculating module, for summing up the temporal domain block differences to generate the temporal domain difference.

17. The apparatus of claim 16, wherein the temporal domain block difference for each of the first blocks is a sum of pixel differences between the first pixels of the first blocks and the second pixels of the second blocks correspondingly.

18. The apparatus of claim 9, wherein the apparatus identifies the first frame as a frame with noise according to noise value and a threshold value.

19. A method for detecting a noise value of a video signal, comprising:
   determining a spatial domain difference of the video signal according to a plurality of pixels of a first frame of the video signal, wherein determining the spatial domain difference further comprises:
      dividing the first frame into a plurality of blocks containing the plurality of pixels;
      for each of the plurality of blocks, determining a pixel difference between adjacent pixel pairs in each block and summing all the pixels differences to generate a pixel value difference for each block; and
      summing pixel value differences of all the blocks to generate the spatial domain block difference;
   determining a temporal domain difference of the video signal according to the pixels of the first frame of the video signal and a plurality of pixels of a second frame of the video signal, wherein the temporal domain difference is determined according to a sum of pixel differences corresponding to pixels of a first block in the first frame and pixels of a most similar block among a plurality of second blocks in the second frame;
   wherein the plurality of pixels of the second frame are determined according to a motion vector relative to the pixels of the first frame; and
   generating a noise value of the first frame according to the spatial domain difference and the temporal domain difference,
   wherein the second frame is temporally adjacent to the first frame.

* * * * *